Sept. 18, 1962           E. A. NICKELL       3,054,412
LIQUID CONTAINING RECEPTACLES FOR STORING
PLASTIC CONTACT LENSES
Filed Jan. 7, 1960
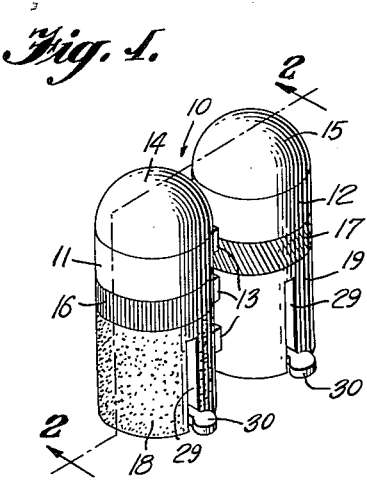
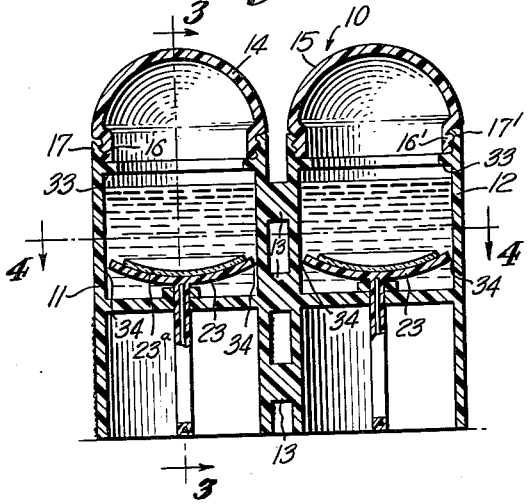
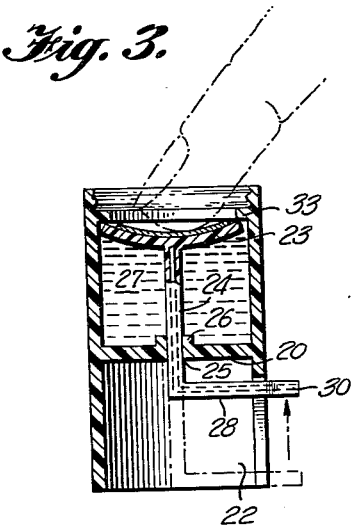
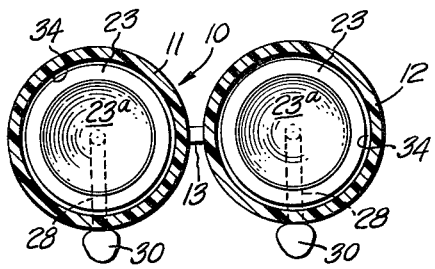
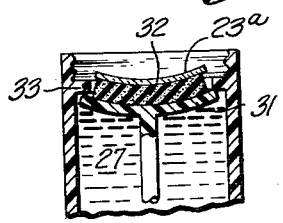
INVENTOR
*Edith A. Nickell*
BY *Mason, Fenwick & Lawrence*
ATTORNEYS United States Patent Office 3,054,412
Patented Sept. 18, 1962

3,054,412
LIQUID CONTAINING RECEPTACLES FOR
STORING PLASTIC CONTACT LENSES
Edith A. Nickell, Gauley Bridge, W. Va.
Filed Jan. 7, 1960, Ser. No. 1,094
4 Claims. (Cl. 134—137)

This invention relates to receptacles, and more particularly to liquid containing receptacles for storing plastic contact lenses.

Contact eye lenses are usually not worn continuously, due to the fact that some irritation is experienced when they are worn for long periods of time. The plastic of which the lenses are made should not be allowed to dry out, because of the fact that its overall size and thickness would change and it would lose its pliability. If returned to the wearer's eye after drying out, and simply moistened before inserting, the magnifying power of the lens would not be correct, and having lost its pliability it would cause irritation of the eye.

If the lenses are dropped in a glass of water, it is difficult to see them. Also, it is likely that the lenses will become scratched if they are slid across the bottom and up the side of a glass or dish. Usually the lens for the right eye is ground to a different prescription than the lens for the left eye, and it is difficult to maintain them in right and left order in a glass or dish. If the lenses are dropped in a dish of water with their convex sides down, they must be submerged by pushing them below the surface, and there is no assurance that the lens will land on the bottom of the dish with its convex side down; and if it lands on its concave side, it is very difficult to remove it from the dish.

Consequently, it is an object of the present invention to provide a receptacle for soaking plastic contact lenses, in which the lens for each eye is placed in clearly identifiable compartments, so that the user can readily determine which lens is for his right eye and which lens is for his left eye.

It is another object of the present invention to provide a means in said compartments which eliminates the necessity of dropping the lens in the liquid, and of fishing it from the bottom of the compartment.

It is a further object of the present invention to provide a means for supporting the lens with its convex side down.

Still another object of the present invention is to provide a means for introducing the soaking liquid into the concavity of the lens before it is submerged, so that it will not float on the liquid.

Other objects and advantages of the present invention will become apparent to those skilled in the art, from the following description when read in conjunction with the accompanying drawing, wherein:

FIGURE 1 is a perspective view of a compartmented contact lens receptacle in accordance with the present invention;

FIGURE 2 is a vertical sectional view taken on the line 2—2 of FIGURE 1;

FIGURE 3 is a vertical sectional view taken on the line 3—3 of FIGURE 2;

FIGURE 4 is a cross-sectional view taken on the line 4—4 of FIGURE 2;

FIGURE 5 is a fragmentary vertical sectional view showing a modified lens support.

Adverting now to the drawing, and more particularly to FIGURE 1, there is shown at 10 the contact lens receptacle of the present invention. A compartment 11 which, as shown in the embodiment used for illustrating the invention is cylindrical in shape, is provided for receiving one of the lenses such as the left lens and a compartment 12, which is similar in size and shape to the compartment 11 is provided for the other lens, such as the right lens. The compartments 11 and 12 are coupled together for convenience in any suitable manner, such as the bridging members 13.

The compartments 11 and 12 are made of any suitable material for holding liquid, such as a synthetic resin plastic, Bakelite being an example, glass, metal, china and the like.

Closure caps 14 and 15 are provided for the compartments 11 and 12 to protect the contents from foreign matter, and to avoid spillage of liquid when the receptacle is carried.

The caps 14 and 15 are provided with screw threads 16, 16' on their depending skirts, which engage the interior threads 17, 17' of the compartments 11 and 12, respectively, as shown in FIGURE 2. The caps 14 and 15 may also be of the pressure fit type (not shown) or the bayonet coupling type (not shown). Also, one of the caps may have one means of attachment and the other cap may have a different means of attachment.

The outsides of the compartments 11 and 12 are provided with indicia to identify the lens which is to be received in the respective compartments. A band 16, colored red for example, encircles the compartment for the left lens, and a band 17, colored green for example, encircles the compartment for the right lens. In addition to this visual indicia, the compartments are also provided with indicia which is identifiable by the sense of touch. The compartment 11 is provided for example, with a roughened area 18, and the compartment 12 is provided with a smooth area 19.

If the caps 14 and 15 are not interchangeable closures for the compartments 11 and 12, as where they have different means of attachment, indicia (not shown) may also be carried by these caps to identify the lens to be received in the compartment on which they fit.

The interiors of the compartments 11 and 12 are similar and each is divided respectively by a partition 20 to divide the compartments into an upper liquid holding chamber or container 21 and a lower chamber 22.

A lens support 23 is mounted in each of the compartments 11 and 12 for movement to and from submerged position when the container 21 is filled with water. In the embodiment used for illustrating the invention, the support 23 is provided with an axially depending shaft 24 which is slidably mounted in a bearing 25 having a packing washer 26 to prevent leakage of fluid 27 from the container 21. The shaft 24 is provided with a radially extending actuator arm 28 joined to the end of the shaft remote from its attachment to the support 23. The walls of the chambers 22, respectively, are provided with vertical slots 29 through which the arm 28 is extended and a fingerpiece 30 is provided on the outwardly extending end of the arm 28. The fingerpiece 30 may also bear identifying indicia.

The lens support 23 is made of a substance which will not scratch the lens 23a to be supported on it. The support may be made of a substance which is not as hard as the lens, or it may be made of a harder substance which is highly polished. As seen in FIGURE 3, the lens may be removed from the support by pressing a finger on it, and it sticks to the finger.

In FIGURE 5, there is shown a modified support comprising a base member 31 and a cushion 32 made of soft foamed rubber or plastic. The cushion 32 is of less diameter than the lens, so that the user's fingernails may grasp the edges of the lens on opposite sides to remove it.

An annular ring 33 at the mouths of the compartments provides a seat for the caps and stops for the upward movement of the platforms.

The compartments 11 and 12 have been shown as being round in cross-section. However, they may be of any desired cross-sectional shape.

As stated, it is necessary to fill the concavity of the lens with liquid as the fingerpiece 30 is pressed downward to submerge the lens. A convenient means for accomplishing this is to provide the support 23 with a transverse configuration which is similar to the cross-sectional configuration of the compartment, but having a substantial small tolerance 34 between the edge of the support and the wall of the compartment. Thus, downward movement of the piston-like support 23 will cause the liquid to squirt around the edge of the support in somewhat of an arch to fill the concavity of the lens before there is sufficient liquid under the lens to float it off of the support.

The user of the contact lens receptacle of the present invention first fills the compartments 11 and 12 with a suitable liquid in which to store his contact lenses. The liquid may be water, saline solution, or the like. He may then advance the support 23 of compartment 11 to its uppermost position, remove the lens from his left eye and place it on the support in compartment 11. By depressing the fingerpiece 30, the support is submerged into the liquid, and liquid flowing upwardly around the edge of the support fills the concavity of the lens, holding it to the support while it is submerged. A similar procedure is followed with respect to the lens for the right eye, placing it on the support 23 of compartment 12 and submerging it in the liquid in the container of that compartment. When the user desires to replace his lenses in his eyes, the support 23 of the compartment 11 is raised to its uppermost position by means of the fingerpiece 30, and since the lens is brought up to the mouth of the compartment, it can readily be removed from the support and placed in the left eye. A similar procedure is followed for the right lens.

While there has been disclosed in the foregoing description a practical embodiment of the liquid containing receptacles for storing plastic contact lenses in accordance with the present invention, it will be understood by those skilled in the art that variations in the implementation of the concept of the invention are within the purview and scope of the invention as defined in the claims.

What is claimed is:

1. A receptacle for storing a plastic contact lens in a liquid comprising, a container for holding said liquid, support means having a continuous upper surface movably mounted in said container for supporting said lens with its concavity uppermost, actuator means coupled with said support for moving said support to and from a submerged position in said liquid and means for spilling liquid into said concavity of said lens as said support is moved to its submerged position.

2. A receptacle for storing a plastic contact lens comprising, a container for holding said liquid, support means having a continuous upper surface extending across said container and mounted for axial movement in said container for supporting said lens with its concavity uppermost, actuator means coupled with said support below the surface of the liquid for moving said support to and from submergence in said liquid, said support means having an impervious concavity in said upper surface for receiving said lens and a substantially similar configuration to the cross-section of said container and forming a loose fitting piston therein, so that when said support is submerged in said liquid said liquid will flow upward around said support and spill into the concavity of said lens.

3. A receptacle for storing a pair of plastic contact lenses for the left and right eyes of the user comprising, a pair of compartments, one for each lens, indicia on each of said compartments for identifying the compartment in which each lens is stored, each of said compartments having a container for holding liquid, support means having a continuous upper surface and an impervious concavity in said upper surface for receiving said lens, said support means being movably mounted in each of said containers for supporting a lens with its concavity uppermost, actuator means coupled with said support below said surface for moving said support to and from submerged position in said liquid, and means for spilling liquid into said concavity of said lens as said support is moved to its submerged position.

4. A receptacle for storing a pair of plastic contact lenses for the left and right eyes of the user comprising, a pair of compartments, one for each lens, indicia on each of said compartments for identifying the compartment in which each lens is stored, each of said compartments having a container for holding liquid, support means having a continuous upper surface extending across each of said containers and mounted for axial movement in said containers for supporting one of said lenses respectively thereon with its concavity uppermost, actuator means coupled respectively with each of said supports below said surfaces for moving said support to and from submergence in said liquid, said support means having an impervious concavity in said upper surface for receiving said lens and a substantially similar configuration to the cross-section of said container and forming a loose fitting piston therein, so that when said support moved to submergence in said liquid said liquid will flow upward around said support and spill into the concavity of said lens.

References Cited in the file of this patent

UNITED STATES PATENTS

| | | |
|---|---|---|
| 1,372,328 | Adams | Mar. 22, 1921 |
| 2,069,371 | Klein | Feb. 2, 1937 |
| 2,413,858 | Borgeat | Jan. 7, 1947 |
| 2,568,838 | Wilcox | Sept. 25, 1951 |
| 2,643,661 | Shanahan | June 30, 1953 |
| 2,940,589 | Silverman | June 14, 1960 |
| 2,944,661 | Goldstein | July 12, 1960 |